United States Patent
Ichikawa et al.

(10) Patent No.: US 6,192,096 B1
(45) Date of Patent: Feb. 20, 2001

(54) MAGNETOSTRICTIVE WIRE CONTROL ROD POSITION DETECTOR ASSEMBLY

(75) Inventors: Toshio Ichikawa; Yoshiaki Makihara, both of Tokyo; Syo Imayoshi, Ibaraki-ken, all of (JP)

(73) Assignee: Mitsubishi Heavy Industries, Ltd., Tokyo (JP)

( * ) Notice: Under 35 U.S.C. 154(b), the term of this patent shall be extended for 0 days.

(21) Appl. No.: 09/302,778

(22) Filed: Apr. 30, 1999

(30) Foreign Application Priority Data

Oct. 20, 1998 (JP) .................................................. 10-298599

(51) Int. Cl.⁷ .......................... G21C 17/00; G01B 7/004; H01H 55/00
(52) U.S. Cl. ............................................. 376/258; 335/215
(58) Field of Search ........................... 376/258; 335/215; 73/576, 650

(56) References Cited

U.S. PATENT DOCUMENTS

| 3,846,771 | * | 11/1974 | Young et al. | 340/195 |
| 3,906,469 | * | 9/1975 | Kronk | 340/188 |
| 4,071,818 | * | 1/1978 | Krisst | 324/208 |
| 4,654,590 | * | 3/1987 | Kitaura et al. | 324/208 |
| 5,793,826 | * | 8/1998 | Sato et al. | 376/228 |

FOREIGN PATENT DOCUMENTS

| 2118496 | * | 5/1990 | (JP) . |
| 5187854 | | 7/1993 | (JP) . |
| 406242285 | * | 9/1994 | (JP) . |
| 8285563 | | 11/1996 | (JP) . |
| 9061143 | | 3/1997 | (JP) . |

* cited by examiner

Primary Examiner—Charles T. Jordan
Assistant Examiner—Kyngtack K. Mun
(74) Attorney, Agent, or Firm—Gottlieb, Rackman & Reisman, P.C.

(57) ABSTRACT

A magnetostrictive wire control rod position detector assembly which will allow nuclear reactor output to be increased, control performance to be improved, and peripheral equipment to be rationalized by continuously and accurately detecting the position of a control rod in a reactor core is provided. A magnetostrictive wire control rod position detector assembly (20) comprises: a magnet or magnets (21) mounted on a non-magnetic portion of a movable member (3) which is free to move in the longitudinal direction on the inside of a cylindrical member (1) and is partly composed of a non-magnetic material; a magnetostrictive wire detector (22) longitudinally mounted on the outer circumference of said cylindrical member, which is provided with a receiver (26); and a pulsed current generator circuit (37) which supplies a pulsed current from the receiver end to the magnetostrictive wire of the magnetostrictive wire detector. When the magnetic field generated in the magnetostrictive wire by the pulsed current approaches the magnetic field of the magnet or magnets on the movable member, mutual interference between the magnetic fields generates torsional waves in the magnetostrictive wire, and the physical position of the movable member can be accurately measured if the propagation time of the torsional waves is measured by the receiver.

9 Claims, 10 Drawing Sheets

MAGNETOSTRICTIVE WIRE CONTROL ROD POSITION DETECTOR ASSEMBLY

BACKGROUND OF THE INVENTION

1. Field of the Invention

The present invention relates to a position detector assembly for a control rod in a nuclear reactor, and in particular relates to a control rod position detector assembly employing a magnetostrictive wire which works in cooperation with a control rod drive unit to continuously monitor the longitudinal position of the control rod relative to the reactor core.

2. Description of the Related Art

FIG. 8 is a cross-section of the construction of a pressurized water nuclear reactor. As shown in the figure, the output of the reactor is controlled by control rod drive units 5 disposed in an upper portion of a reactor vessel 6, which insert and extract control rods 4 into and out of the reactor core. The control rods are moved longitudinally by longitudinally moving drive shafts 3 connected to the control rods 4 within pressure housings 1. The positions of the drive shafts 3, that is, the positions of the control rods 4 relative to the reactor core, are detected by control rod position detector assemblies 7 comprising detector coils 2 disposed around the outer circumference of each of the pressure housings 1.

FIG. 9 is a cross-section showing the relationship between the control rod drive unit 5 and the conventional control rod position detector assembly 7. As shown in the figure, the conventional control rod position detector assembly 7 comprises detector coils 2 mounted on the outside of the pressure housing 1 of the control rod drive unit 5. Detector coils 2 corresponding in number to the length of the control rod 4 when withdrawn from the reactor core, usually forty-two, are mounted with even spacing on a coil support pipe 8 on the outside of and coaxial to the pressure housing 1. In anticipation of events such as breakages in the wiring, the detector coils are divided into two systems consisting of an A system comprising the set of alternate detector coils 2a and a B system comprising the set of detector coils 2b. The spacing between adjacent detector coils is approximately 90 mm, or when each system is considered separately, 180 mm because of the alternation. At the same time, the drive shaft 3 of the control rod drive unit 5, which is the portion whose position is detected, is usually composed of a stainless magnetic material. As a result, the drive shaft 3 itself is magnetized because the magnetic field from the control rod drive unit 5 is strong.

Since the temperature within the pressure housing 1 is approximately 300 degrees Celsius, limits on the working temperature of the insulating materials used in the detector coils 2 of the control rod position detector assembly 7 make cooling the coils compulsory. For that reason, air is supplied to the space 9 between the pressure housing 1 and the detector coil support pipe 8 on which the detector coils are mounted and the detector coils are air-cooled from within as shown in FIG. 9.

Next, the method of detecting the position of a control rod 4 by means of the detector coils 2 of the control rod position detector assembly 7 will be explained. When the magnetic drive shaft 3 passes through the center of a detector coil 2, an electric potential is induced in the detector coil 2 and as a result the impedance in the detector coil 2 changes. Consequently, by detecting the changes in impedance in each of the detector coils 2, the position of the tip of the magnetic drive shaft 3 can be detected as it moves inside the pressure housing 1 of the control rod drive unit 5, and thus the position of the control rod 4 within the nuclear reactor can be ascertained.

Also, in order to ensure the reliability of the reactor, it is necessary to measure the descent times (insertion times) of the control rods. The method of measuring the descent times of a control rod by means of the control rod position detector assembly 7 is to measure the insertion times from when a control rod starts to descend until it reaches a dashpot 10 (see FIG. 10) by means of the changes in electric potential (changes in velocity) in the generated electric currents which depend on the descent velocity of the magnetic drive shaft 3 as it passes through the detector coils 2. Thus, as shown in FIG. 11, when the descent velocity of the control rod 4 is fast, the electric potential of the electric current generated in an detector coils 2 rises, and when the velocity of the control rod 4 suddenly decreases, the electric potential suddenly decreases. In order to make use of such changes in the electric potential of the electric current generated in the detector coils 2, the dashpots in a fuel assembly which decelerate control rods 4 by means of fluid resistance are each disposed in a position approximately 85 percent of the fully inserted position. Consequently, the position of each control rod 4 can be precisely determined by a sudden decrease in electric potential at a position such as T1 shown in FIG. 11.

Moreover, whether or not the control rod 4 has been completely inserted into the reactor core is determined, as shown in FIG. 11, by detecting the rebound waveform R up to the rest point T2, that is, the waveform of the rebounding of the drive shaft 3 due to shock absorbing springs mounted on the control rod clusters as the drive shaft 3 of the control rod 4 reaches the bottom end.

However, since the position of the tip of the drive shaft 3 is detected by changes in impedance in the detector coils 2, signals indicating the position of the control rod 4 can only be obtained at the positions of the detector coils 2. In other words, the intervals at which the position of the control rod 4 can be detected, depend on the spacing at which the detector coils are mounted, which is approximately 90 mm. Generally, a control rod drive unit 5 drives a control rod 4 in steps, the length of each of these steps being approximately 16 mm. Consequently, one problem is that the physical position of the control rod 4 can only be confirmed at intervals corresponding to several drive steps.

Furthermore, the detector coils 2 are divided into two systems, the A system and the B system, and when one system cannot be used because of circuit failure, the position can only be detected at the single system intervals of 180 mm, in other words, intervals approximately ten times the length of a drive step of the control rod 4, further reducing accuracy. Consequently, from the viewpoint of a protective system for the reactor, there is a need to consider the uncertainty of the position of the control rods when designing reactor cores.

In addition, as explained above, measurement of the descent times of the control rods according to the control rod position detector assembly 7 involves measuring the insertion times from the commencement of descent until a dashpot is reached by means of the changes in electric potential in the electric currents which depend on the descent velocity of the magnetic drive shaft 3 as it passes through the detector coils 2, and it is well known that the descent times of a control rod cannot be accurately measured when the descent velocity is slow because the electric potential is low, making the commencement of descent, the position of the dashpot, and the fully inserted position unclear.

Moreover, in a rare event such as the control rod 4 stopping during descent, it is impossible to confirm the rest position of the control rod 4 (fully inserted or partway), and therefore the accuracy and reliability of the detection of the position of the control rod is low.

Similarly, when the rebound waveform used to determine whether the control rod 4 has been completely inserted is smaller than the descent velocity, the former is often unclear, and it is therefore difficult to detect whether the control rod 4 has been completely inserted into the reactor core.

In addition, due to limits on the working temperature of the insulating materials used in the detector coils 2 of the control rod position detector assembly 7, the ambient temperature around the detector coils 2 must be vigorously cooled and it is necessary to ensure that design conditions are not exceeded, requiring that the volume of the cooling equipment for the control rod drive unit be made quite large so that it can handle the large amounts of heat given off by the housing 1 which is heated to temperatures as high as about 300 degrees Celsius.

SUMMARY OF THE INVENTION

The present invention aims to solve the above problems and a major object of the present invention is to provide a magnetostrictive wire control rod position detector assembly which will allow nuclear reactor output to be increased, control performance to be improved, and peripheral equipment to be rationalized by continuously and accurately detecting the position of a control rod in a reactor core.

In order to achieve the above object, according to a major aspect of the present invention, a magnetostrictive wire control rod position detector assembly for detecting the position of a movable member within a cylindrical member comprises: a magnet or magnets mounted on a non-magnetic portion of the movable member which is free to move in the longitudinal direction on the inside of the cylindrical member and is at least partly composed of a non-magnetic material; a magnetostrictive wire detector longitudinally mounted on the outer circumference of the cylindrical member, which is provided in a predetermined place with a receiver which detects torsional waves; and a pulsed current generator circuit which supplies a pulsed current from the receiver end of the magnetostrictive wire detector to the magnetostrictive wire of the magnetostrictive wire detector.

In such a construction, a rotational magnetic field is generated in the magnetostrictive wire by the pulsed current. When the rotational magnetic field approaches the magnetic field of the magnet or magnets mounted on the movable member, mutual interference between the magnetic fields generates torsional waves in the magnetostrictive wire. By measuring the propagation time of the torsional waves using the receiver which is disposed on a predetermined portion of the magnetostrictive wire, the physical position of the movable member can be accurately measured.

It is preferable that the magnet or magnets be ring-shaped and that the magnetostrictive wire detectors be disposed plurally on the outer circumference of the cylindrical member. That way the magnetostrictive wire position detector assembly can be made to perform multiple functions. That is to say, the magnetostrictive wire position detector assembly will then be able to detect the position of the movable member precisely even if the movable member is inclined within the cylindrical member, and at the same time, the ability to detect the position of the movable member will then not be lost even if one of the magnetostrictive wire detectors malfunctions.

In addition, a cylindrical support member should ideally be provided so as to seal closed the outer circumference of the cylindrical member and the magnetostrictive wire detectors with a predetermined spacing. As a result, a heat insulating effect will arise due to the layer of air existing in the space, reducing the radiation of heat from the cylindrical member.

It is also preferable that a protective member formed from the same non-magnetic material as the non-magnetic portion of the drive shaft be mounted so as to hermetically seal the magnet or magnets against the non-magnetic portion. This will prevent oxidation of the magnet or magnets, ensuring that the strength of the magnetic field of the magnet or magnets remains constant and stabilizing the precision of the measurements as well as reducing maintenance costs.

The cylindrical member may also be the pressure housing of the control rod drive unit, and the movable member may be the drive shaft connected to the control rod of the control rod drive unit, and the position of the drive shaft may be detected.

The position within a reactor core of the control rod connected to the drive shaft can be accurately detected along the entire drive length from the fully inserted position to the fully withdrawn position by detecting the position of the drive shaft within the pressure housing.

It is also desirable that the construction enable the detection of the control rod insertion times from the commencement of the descent of the control rod corresponding to the detected position of the control rod when the control rod is allowed to descend from the fully withdrawn position by measuring in advance a relationship between times and distances from the fully withdrawn position.

By storing the descent times (insertion times) as high-precision digital data by means of the magnetostrictive wire detectors, the times taken by the control rod to reach the dashpot and the fully inserted position from the commencement of descent can be calculated from the data. For that reason, in the rare event that a control rod stops during descent, it will be possible to confirm the rest position of the control rod (fully inserted or partway) from the insertion times of the control rod, ensuring the reliability of the nuclear reactor.

BRIEF DESCRIPTION OF THE DRAWINGS

FIG. 4 (*b*) is a diagram explaining the magnetic fields of the permanent magnets;

DETAILED DESCRIPTION OF THE PREFERRED EMBODIMENT

Figure 1:
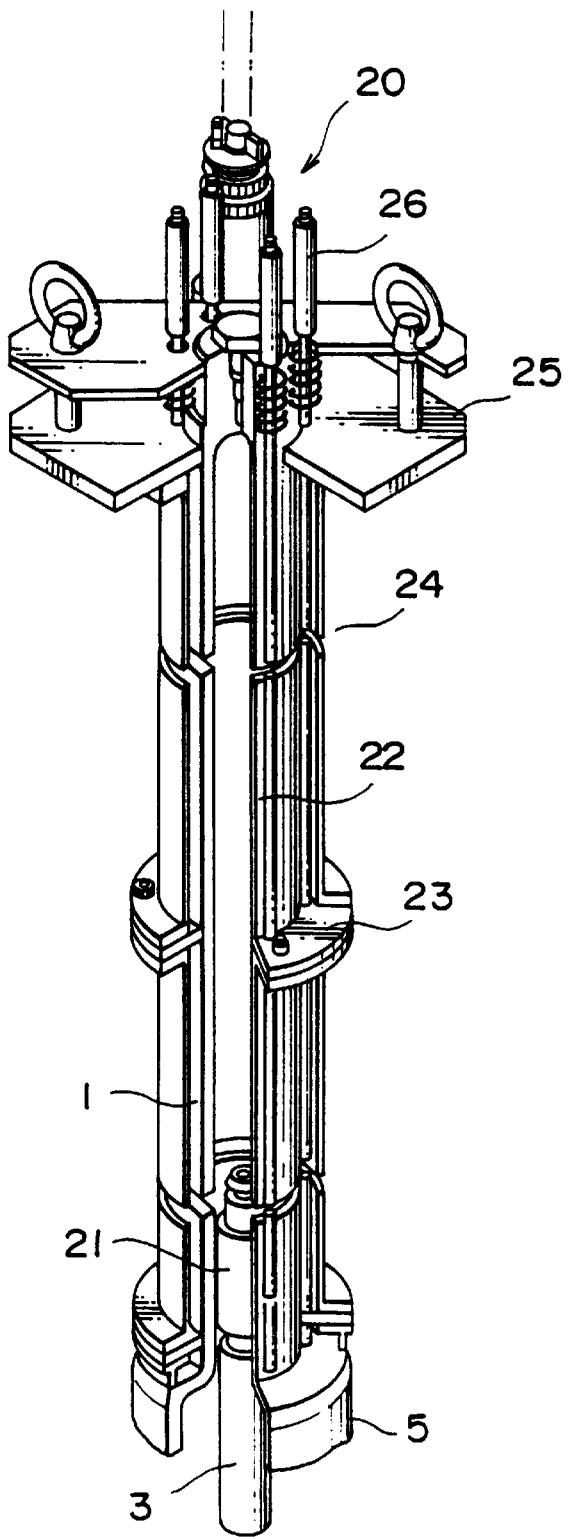
FIG. 1 is a perspective view showing the general concept of the magnetostrictive wire control rod position detector assembly according to the present invention.

Next, the preferred embodiment of the magnetostrictive wire control rod position detector assembly according to the present invention will be explained with reference to the attached drawings. In the drawings, use of the same numeral indicates identical or corresponding portions.

In the following explanation, compositional elements which are similar throughout the figures will be given the same reference numeral. Moreover, in the following explanation, the terms "left", "right", "up", "down", etc., will be used for convenience, but these terms should not be interpreted to limit the invention in any way.

Figure 2:
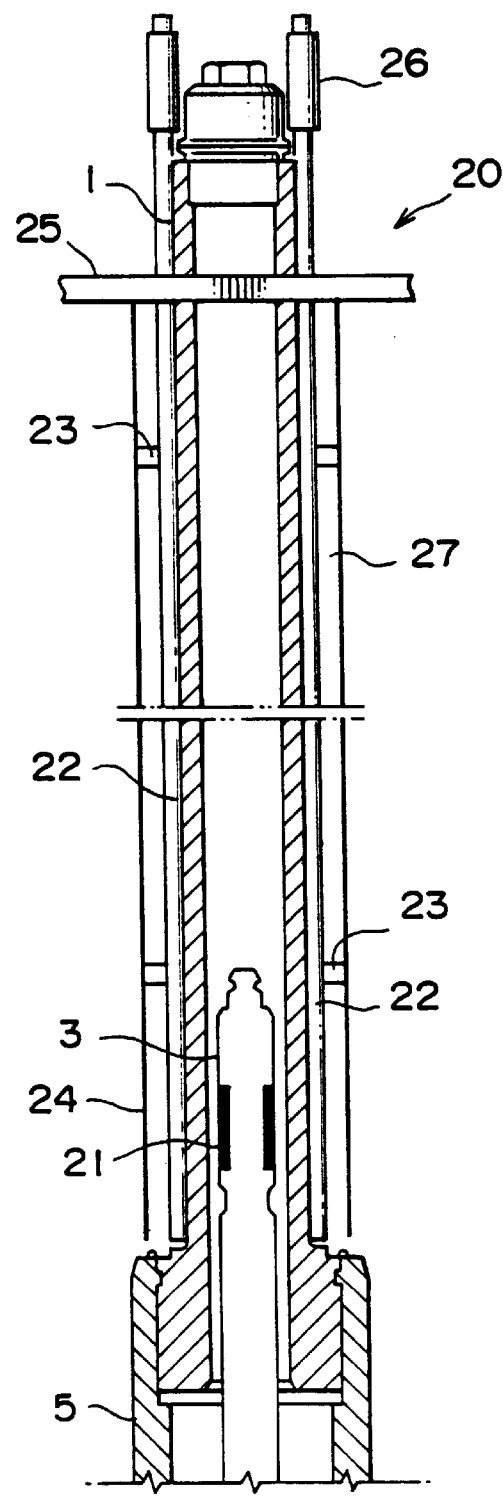
FIG. 2 is a vertical cross-section structural diagram of part of the magnetostrictive wire control rod position detector assembly according to the present invention.
Figure 3:
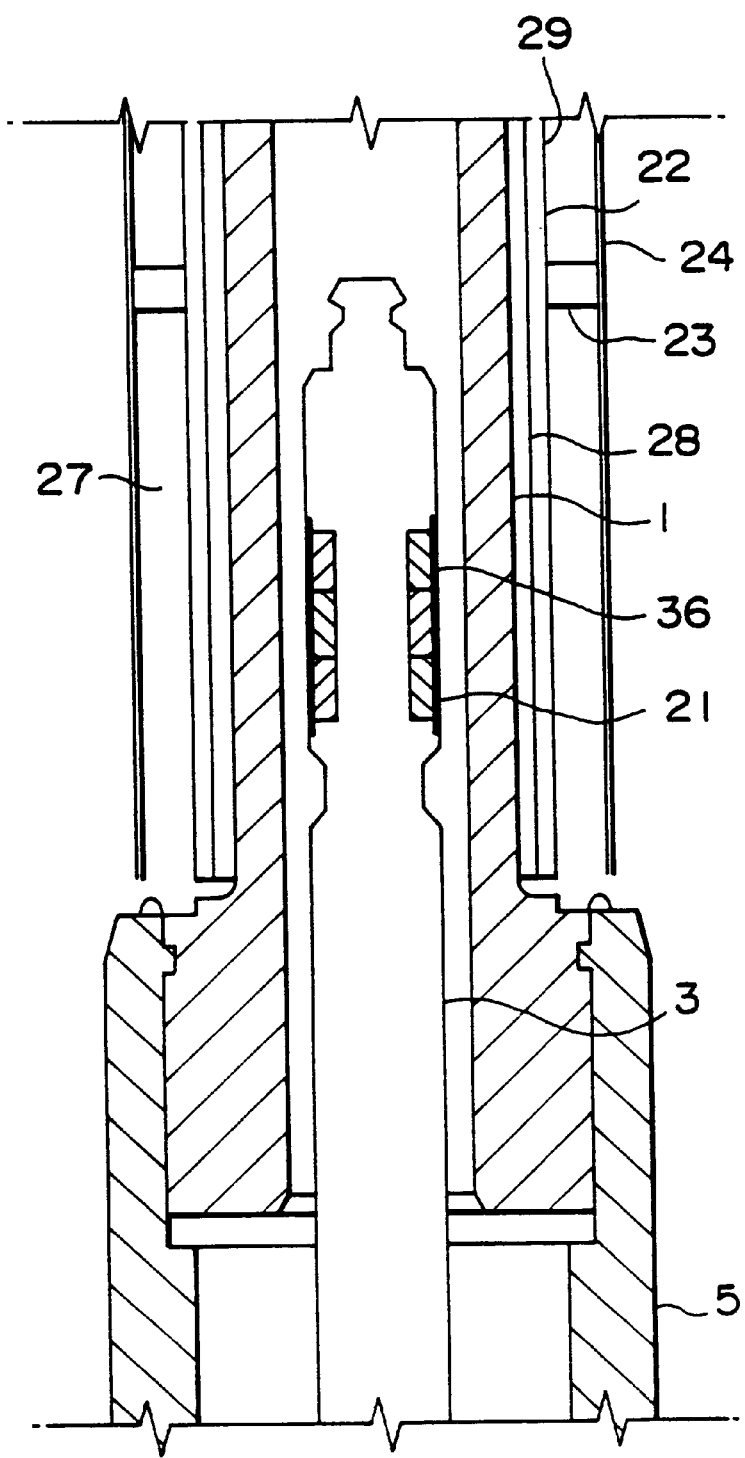
FIG. 3 is an enlargement of part of FIG. 2 showing the fitted construction of the permanent magnets.

FIG. 1 is a perspective view showing the overall construction of a magnetostrictive wire control rod position detector assembly 20 mounted at the upper end of a control rod drive unit 5, FIG. 2 is a vertical cross-section of part thereof, and FIG. 3 is an enlargement of part of FIG. 2. In these figures, the magnetostrictive wire control rod position detector assembly 20 comprises: permanent magnets 21 mounted on an upper end portion of a drive shaft 3 positioned within a pressure housing 1 of the control rod drive unit 5; and magnetostrictive wire detectors 22 secured to the outside of the pressure housing 1 by support structures 23. The magnetostrictive wire detectors 22 are also provided with receivers on the upper end portions thereof above a support member 25. Moreover, support cylinders 24 are disposed on the outside of the support structures coaxial to the pressure housing 1, and spaces 27 are defined between the support cylinders 24 and the magnetostrictive wire detectors 22.

The magnetostrictive wire detectors 22, the lengths of which cover the drive stroke of a control rod 4, are disposed longitudinally along the pressure housing 1 and are secured in the circumferential direction by a plurality of annular support structures 23 so as to be in close contact with the outside of the pressure housing 1. The magnetostrictive wire detectors 22 can be placed in close contact with the pressure housing 1, whose internal temperature is approximately 300 degrees Celsius, because the detectors 22 are treated to make them heat-resistant to high-temperature specifications. The reason for placing the detectors 22 in close contact is to improve precision during detection of the position of the control rod. Furthermore, the mounting of one magnetostrictive wire detector 22 is sufficient from the viewpoint of measurement. However, in order to improve precision further, it is preferable to mount detectors 22 in sets of two. Moreover, when used as a protective system, four detectors should be mounted around the pressure housing 1 in sets of two. In this embodiment, four magnetostrictive wire detectors 22 are disposed with even spacing around the circumference of the pressure housing 1 as shown in the horizontal cross-section in FIG. 4 (*a*). Consequently, the magnetostrictive wire detectors 22 are able to detect the drive shaft 3 very precisely and accurately even if the drive shaft 3 is inclined within the pressure housing 1. This is desirable not only for a reactor control system, but also from the viewpoint of a reactor protection system, as will be explained in detail below.

As shown in FIG. 3, the magnetostrictive wire detectors 22 comprise magnetostrictive wires 28 and protective tubes 29 consisting of stainless steel tubing with a diameter of about 10 mm. Moreover, the magnetostrictive wires 28 are constructed so as to prevent contact with the protective tubes 29 on the outside thereof by the method described below.

Figure 5:
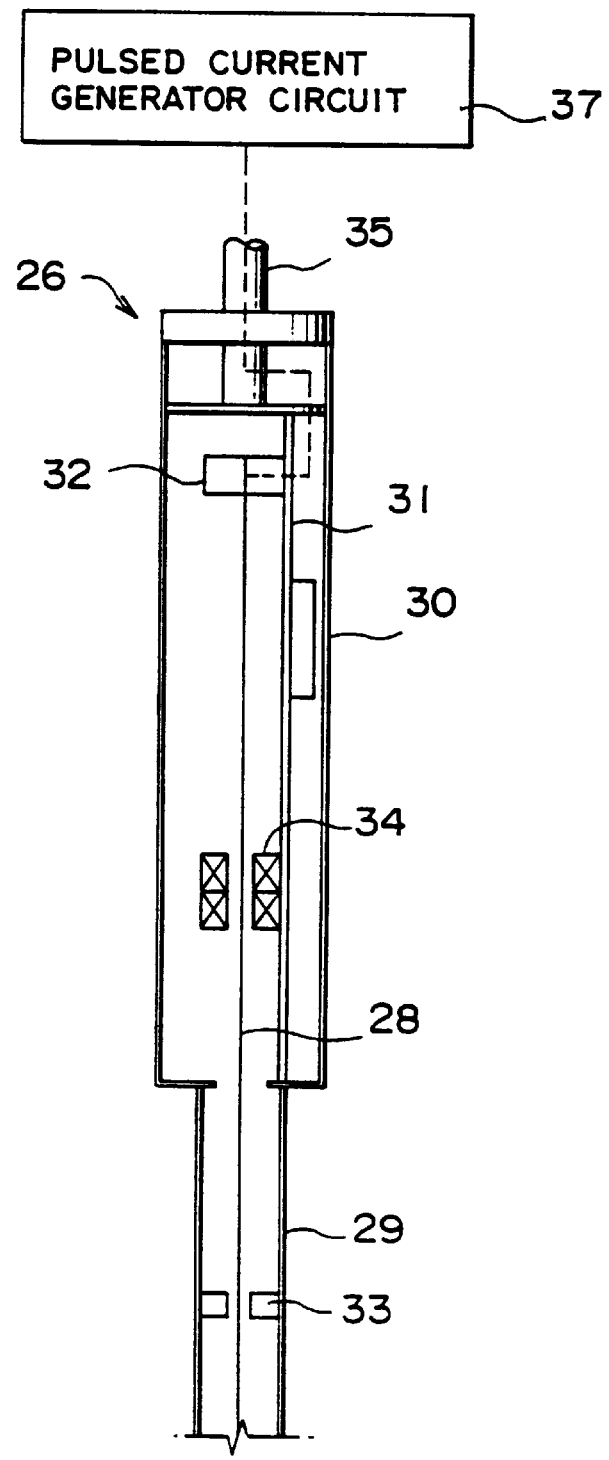
FIG. 5 is a vertical cross-section structural diagram showing part of the receiver of a magnetostrictive wire detector.

As shown in FIGS. 1 and 2, the magnetostrictive wire detectors 22 comprise receivers 26 for detecting torsional waves (explained below) which propagate through the magnetostrictive wires 28 disposed at the upper end of the magnetostrictive wire detectors 22. FIG. 5 is a structural diagram showing part of one of these receivers 26. In this diagram, the receiver 26 comprises a casing 30 connected to the protective tube 29 of a magnetostrictive wire detector 22. A support member 31 is disposed within the casing 30. The magnetostrictive wire 28 is held at the center of a magnetostrictive wire holder 32 secured to the support member 31. The magnetostrictive wire 28 is prevented from contacting the protective tube 29 by being held in the center of the tube and by means of guide rings 33 disposed within the protective tube 29. Detector coils 34 are mounted on the support member 31 slightly lower than the middle of the casing 30 in the longitudinal direction so as to surround the magnetostrictive wire 28. Moreover, the signals detected by the detector coils 34 are sent to a control portion (not shown) by means of a cable 35. Furthermore, the upper end of the magnetostrictive wire 28, in other words, the end held by the magnetostrictive wire holder 32, is connected through the cable 35 to a pulsed current generator circuit or circuits 37. Furthermore, the magnetostrictive wire holder 32 is composed of a vibration absorbing material in order to prevent reflection of the torsional waves propagated in the magnetostrictive wire 28.

Figure 7:
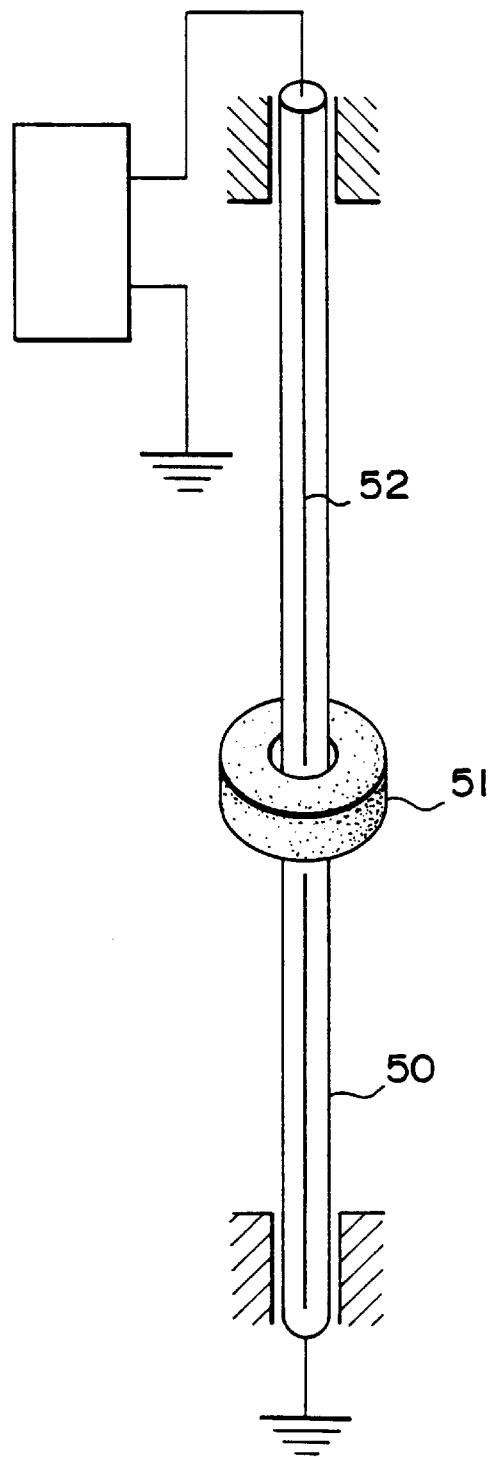
FIG. 7 is a conceptual diagram showing part of a conventional magnetostrictive wire detector.
Figure 8:
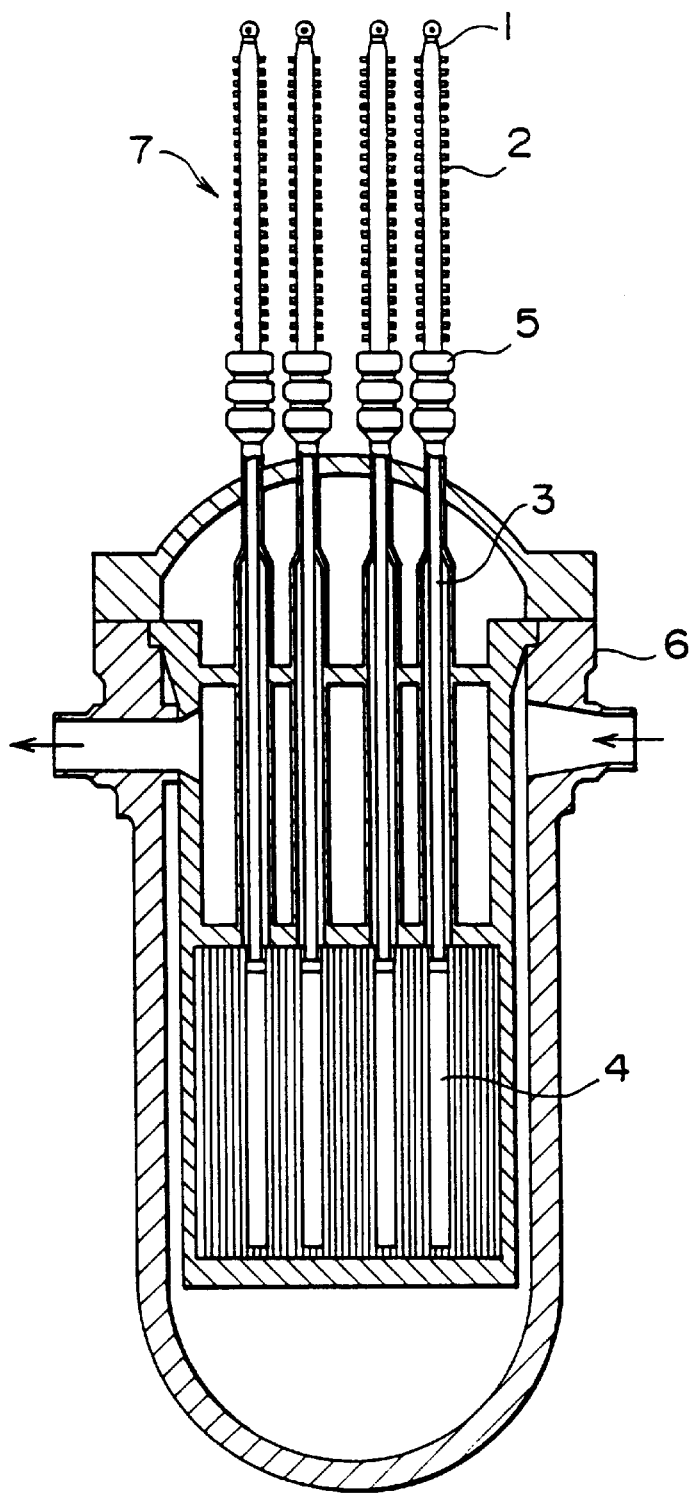
FIG. 8 is a cross-section showing part of a general pressurized water nuclear reactor.
Figure 9:
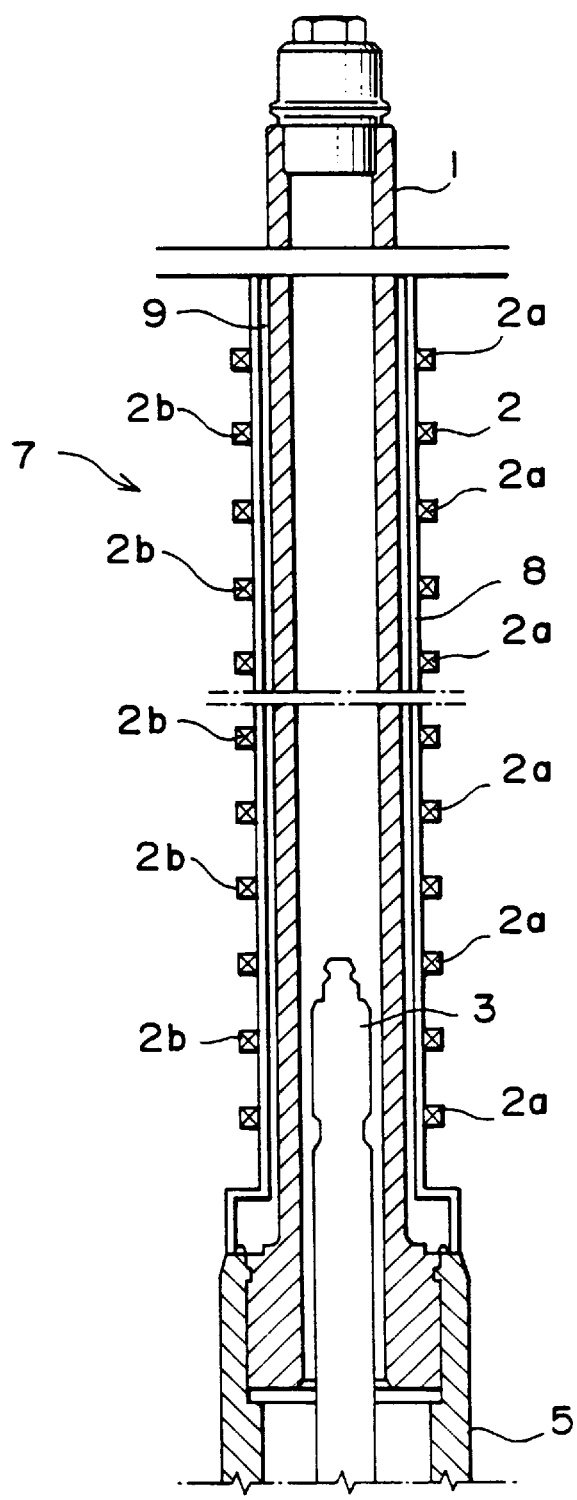
FIG. 9 is a vertical cross-section structural diagram showing part of a conventional control rod position detector assembly.
Figure 10:
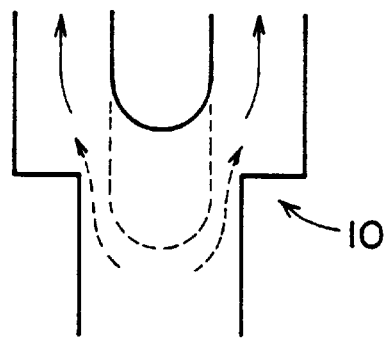
FIG. 10 is a conceptual diagram showing a dashpot for slowing the descent velocity of a control rod.
Figure 11:
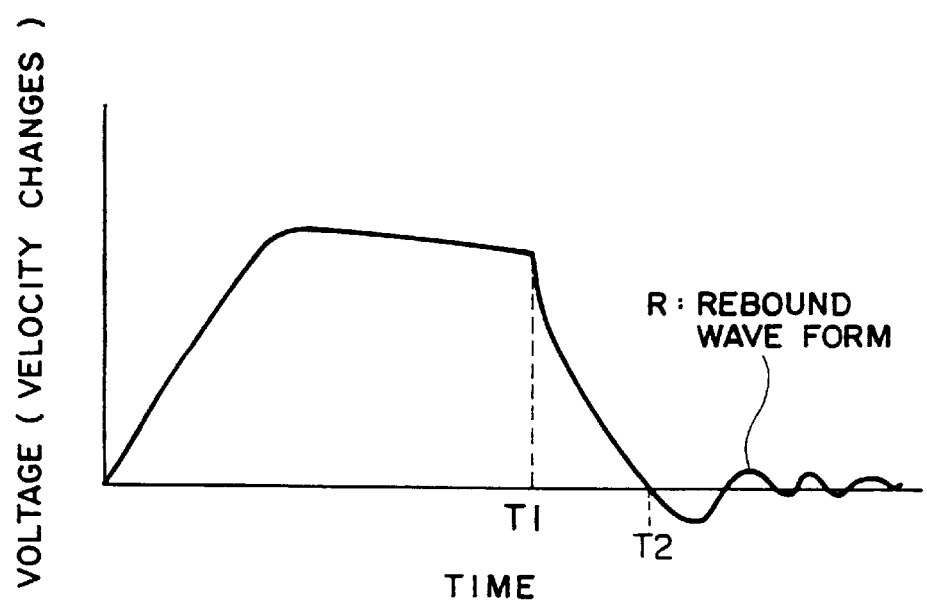
FIG. 11 is a graph showing changes in the control rod insertion time measured by a conventional control rod position detector assembly.

Returning to FIG. 3, the permanent magnets 21 mounted on the upper end portion of the drive shaft 3 are formed into a ring shape. Furthermore, in order to apply the principle of position detection by means of a magnetostrictive wire (explained below) without major modifications to the conventional control rod drive unit 5, the permanent magnets 21 are mounted in a cylindrical formation longitudinally on the outer circumference of the drive shaft 3. That is to say that, whereas a conventional magnetostrictive wire detector 50 like that shown in FIG. 7 places a magnetostrictive wire 52 inside a ring-shaped permanent magnet 51, in this embodiment, there is a certain distance between the drive shaft 3 and the pressure housing 1, and furthermore, the permanent magnets 21 are relative to one side of the magnetostrictive wires 28 outside, and therefore the permanent magnets 21 are disposed in a cylindrical formation so that the magnetic field outside the pressure housing 1 is strong. Moreover, as shown in FIG. 3, the permanent magnets 21 comprise three magnets. However, using one integrated cylindrical permanent magnet strengthens the magnetic field and improves performance.

Furthermore, when a magnetic jack control rod drive unit is used as the control rod drive unit 5, there is a possibility that the drive shaft 3 will vibrate during operation. As a result, there is a possibility that the drive shaft 3 may move radially and contact the inside of the pressure housing 1, damaging the permanent magnets 21. Consequently, the permanent magnets 21 are protected by mounting a protective tube 36 made of the same material as the drive shaft 3 onto the outside of the permanent magnets 21 after mounting the ring-shaped permanent magnets 21 onto the drive shaft 3. Furthermore, by sealing the permanent magnets 21 between the drive shaft 3 and the protective tube 36, oxidation of the permanent magnets 21 can be prevented. Moreover, magnetic material was used in the conventional drive shaft 3, but in the present embodiment, the upper end portion of the drive shaft 3 and the protective tube 36 are composed of a non-magnetic metal in order to make position detection signals from the permanent magnets 21 clear.

Next, the method of detecting the position of a control rod 4 by means of the magnetostrictive wire control rod position detector assembly 20 will be explained using FIGS. 6 (a) to (c).

Figure 6A:
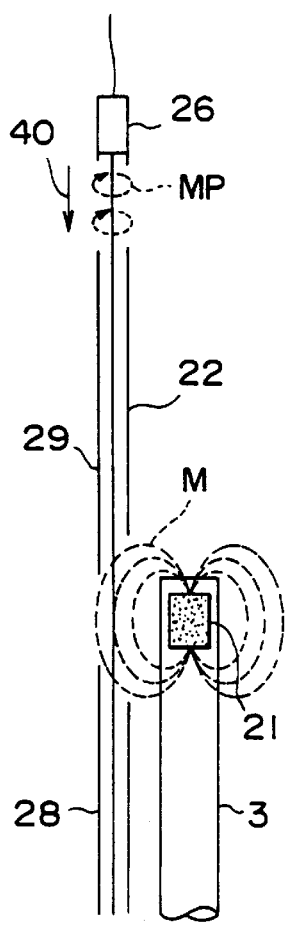
FIGS. 6 (*a*) to (*c*) are diagrams explaining the principle of measurement in position detection by a magnetostrictive wire detector.
Figure 6B:
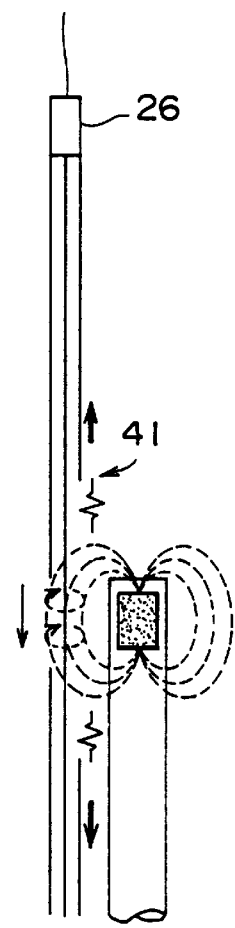
Figure 6C:
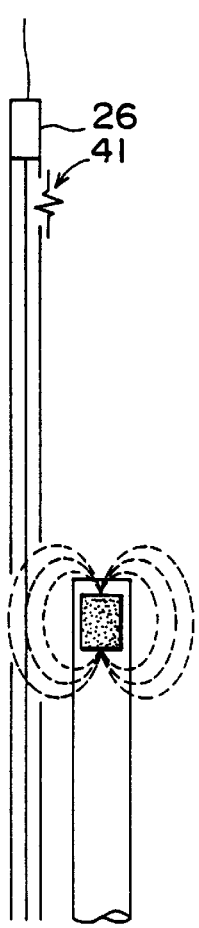

As shown in FIG. 6 (a), in its initial state, the magnetostrictive wire 28 of the magnetostrictive wire detector 22 is positioned within the magnetic field M of the permanent magnets 21 mounted on the drive shaft 3. However, the magnetostrictive wire 28 is not twisted by the magnetic field M of the permanent magnets 21 alone and remains in its initial state.

First, in this condition, a pulsed current 40 is imparted towards the magnetic field M in the longitudinal direction of the magnetostrictive wire 28 from the receiver 26 end by the pulsed current generator circuit 37. In so doing, a torsional magnetic field MP is generated around the magnetostrictive wire 28 in accordance with the right-hand rule, and the torsional magnetic field MP propagates along the magnetostrictive wire 28 towards the magnetic field M of the permanent magnets 21. Because the propagation velocity is extremely fast, this is taken as the "0" count for measurement purposes.

Next, as shown in FIG. 6 (b), when the pulsed current 40 approaches the permanent magnets 21 mounted on the drive shaft 3, that is to say, when the torsional magnetic field MP of the pulsed current 40 interferes with the magnetic field M of the permanent magnets 21, the magnetostrictive wire 28 is instantaneously twisted. As a result, torsional waves 41 are generated along the magnetostrictive wire 28 in both directions from the point at which the two magnetic fields interfere and twisting occurs.

Then, as shown in FIG. 6 (c), the propagation time from the imparting of the pulsed current 40 to the arrival of the torsional wave 41 is measured by the receiver 26 disposed at the upper end of the magnetostrictive wire detector 22. By calibrating the measured propagation time against the longitudinal propagation velocity in the magnetostrictive wire 28, it is possible to calculate the absolute value of the distance from the receiver 26 to the permanent magnets mounted on the upper end portion of the drive shaft 3. Using this method, it is possible to precisely and accurately measure the physical position of the control rod 4 to within the length of one control rod drive step (approximately 16 mm). As a result, it is possible to check for the presence of discrepancies in the position of the control rod 4. Furthermore, it is also possible to reduce the design margins introduced into core designs to compensate for uncertainties in the positions of the control rods, leading to merits such as increased output.

Next, the measurement principle shown in FIGS. 6 (a) to (c) can be used to measure the descent times (insertion times) of a control rod 4. That is to say, by generating pulsed currents 40 at predetermined time intervals and continuously measuring the physical position of the control rod 4 by means of the magnetostrictive wire detectors 22, the changes in the position of the control rod 4 corresponding to the commencement of descent of the drive shaft 3 until the drive shaft 3 stops can be accurately measured. As a result, the descent times (insertion times) can be stored as high-precision digital data. Using these data, the times taken for the control rod 4 to reach the position of the dashpot, the fully inserted position, or any intermediate position from the commencement of descent can be accurately calculated. For that reason, the precision of measurement of the descent times of the control rod 4 can be improved, ensuring reliability of the reactor.

Furthermore, since the changes in descent velocity of the control rod 4 and the confirmed positions of the control rod 4 are stored as digital data, even in the rare event that the control rod 4 stops during descent, it is possible to ascertain the rest position of the control rod 4 (fully inserted or partway) accurately. Consequently, as the accuracy and reliability of the detection of the position of the control rod 4 are improved, it is also possible to determine easily whether the control rod 4 has been completely inserted or not. Because the longitudinal position of the control rod 4 can be continuously ascertained with high precision and the lowest inserted position (fully inserted position) of the control rod can be accurately detected in this manner, it is possible to reduce the design margins introduced into core designs to compensate for uncertainties in the positions of the control rods, and the design merits of the control system enable increased safety margins, increases in output, etc., to be considered in the operation of the reactor.

Figure 4A:
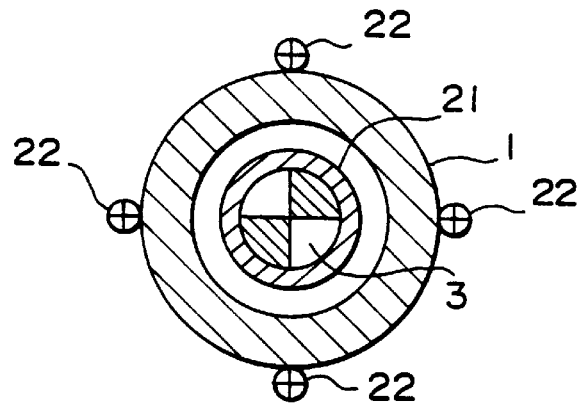
FIG. 4 (*a*) is a cross-section showing the arrangement of the magnetostrictive wire detectors.
Figure 4B:
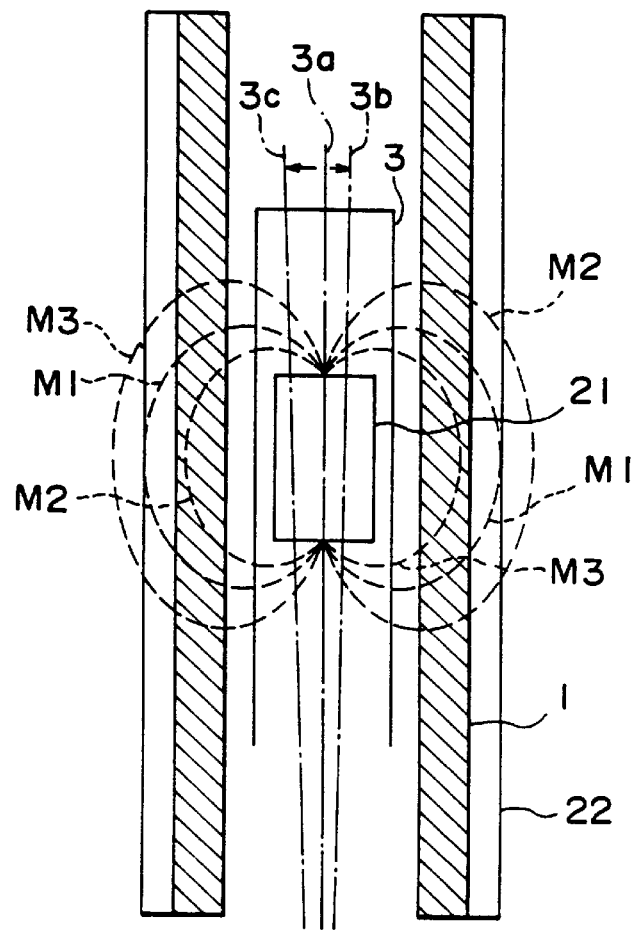

In this embodiment, as explained above, four magnetostrictive wire detectors 22 are disposed with even spacing around the circumference of the pressure housing 1 (see FIG. 4 (a)). Here, one system is composed of a pair of magnetostrictive wire detectors 22 disposed in positions 180 degrees opposite to each other, and two such systems are installed. A plurality of magnetostrictive wire detectors 22 are mounted in this manner so that the position of the drive shaft 3 can be precisely and accurately detected even if the drive shaft 3 is inclined within the pressure housing 1, as shown in FIG. 4 (b).

For example, as shown in this figure, if the drive shaft 3 is positioned centrally within the pressure housing 1 (see center line 3a), the magnetic field M1 of the permanent magnets 21 is equal on the left and right, but when the drive shaft 3 is inclined to the right (see center line 3b), the magnetic field M2 of the permanent magnets 21 is stronger on the right, and when the drive shaft 3 is inclined to the left (see center line 3c), the magnetic field M3 of the permanent magnets 21 is stronger on the left. Consequently, if a magnetostrictive wire detector 22 were mounted only on the right, when the drive shaft 3 was inclined to the left the magnetic field M3 of the permanent magnets 21 would be weak on the right and there would therefore be a risk that the torsional magnetic field of the pulsed current propagated in the magnetostrictive wire detector 22 would interfere in a different position and precision would deteriorate. However, when a pair of magnetostrictive wire detectors 22 are disposed in positions 180 degrees opposite to each other, the detection function is multiplied, and even if the drive shaft 3 is inclined within the pressure housing 1, the precision of detection of the position of the drive shaft 3 can be increased by averaging the positional data detected by the pair of magnetostrictive wire detectors 22. Nevertheless, even if only one magnetostrictive wire detector 22 is mounted and the drive shaft is inclined to the maximum, the position of the drive shaft 3 can still be measured precisely to within a drive step (16 mm).

Furthermore, by installing a plurality of systems of pairs of magnetostrictive wire detectors 22, even if one detector fails, the position of the drive shaft 3 can be detected by the other detectors, enabling the invention to be applied not only to reactor control systems, but also to reactor protection systems. Also, by incorporating more precise position signals for control rods 4 into reactor protection systems, operability can be improved, the number of thermocouples, etc., can be reduced, output can be increased further, etc., contributing significantly to plant rationalization.

Furthermore, in this embodiment, as explained above, support cylinders 24 are disposed coaxial to the pressure housing 1 on the outside of the support structures 23 which seal and secure the magnetostrictive wire detectors 22 to the pressure housing 1. A layer of air exists in the space 27 sealed by the magnetostrictive wire detectors 22, the support cylinders 24 and the support member 25. Consequently, a heat insulating effect is generated by the layer of air (see FIGS. 1 and 2). As a result, a large amount of the radiant heat from the high-temperature interior (approximately 300 degrees Celsius) of the pressure housing 1 can be shut out, enabling the volume of the cooling equipment for the control rod drive unit to be reduced.

In this embodiment, the permanent magnets 21 mounted on the drive shaft 3 are ring-shaped, but the permanent magnets are not limited to this shape, and half-rings or flat bars can also be mounted. Furthermore, the permanent magnets 21 are mounted on an upper end portion of the drive shaft 3, but the permanent magnets 21 can be mounted on any position on the drive shaft 3, provided that the position of the control rod can be detected from the fully withdrawn position to the fully inserted position. In addition, in this embodiment, only the upper end portion of the drive shaft 3 is composed of non-magnetic material, but the entire body thereof can be composed of non-magnetic material.

As explained above, in this embodiment, the magnetostrictive wire control rod position detector assembly 20 can be constructed simply by mounting magnetostrictive wire detectors 22 and receivers 26 on the outside of the pressure housing 1 of the control rod drive unit 5 and mounting permanent magnets 21 on an upper portion of the drive shaft 3, enabling the existing control rod drive unit to be used without modification.

The embodiment of the present invention presently considered to be ideal and other alternative embodiments have been explained in detail with reference to the drawings, but the present invention should not be limited to these embodiments, and additional applications and modifications of any sort to the magnetostrictive wire control rod position detector assembly can be easily conceived and realized by those skilled in the art without deviating from the spirit and scope of the present invention.

What is claimed is:

1. A magnetostrictive wire control rod position detector assembly for detecting the position of a movable member within a cylindrical member, comprising:

a ring-shaped magnet or ring-shaped magnets mounted on a non-magnetic portion of said movable member which is free to move in the longitudinal direction on the inside of said cylindrical member and is at least partly composed of a non-magnetic material;

a plurality magnetostrictive wire detectors longitudinally mounted on the outer circumference of said cylindrical member, which is provided in a predetermined place with a receiver which detects torsional waves; and a pulsed current generator circuit which supplies a pulsed current from said receiver end of said magnetostrictive wire detector to the magnetostrictive wire of said magnetostrictive wire detector.

2. The magnetostrictive wire control rod position detector assembly according to claim 1, wherein a cylindrical support member is disposed so as to seal closed the outer circumference of said cylindrical member and said magnetostrictive wire detectors with a predetermined spacing.

3. The magnetostrictive wire control rod position detector assembly according to claim 2, wherein a protective member composed of the same non-magnetic material as said non-magnetic portion of said movable member is mounted so as to hermetically seal said magnets against said non-magnetic portion.

4. The magnetostrictive wire control rod position detector assembly according to claim 3, wherein:

said cylindrical member is the pressure housing of a control rod drive unit;

said movable member is a drive shaft connected to the control rod of said control rod drive unit; and the position within a reactor core of said control rod which is connected to said drive shaft is detected along the entire length of a drive stroke from a fully withdrawn position to a fully inserted position by detecting the position of said drive shaft.

5. The magnetostrictive wire control rod position detector assembly according to claim 4 wherein the construction comprises means for determining the time from the commencement of the descent of the control rod to any detected position of the control rod when the control rod is allowed to descend from the fully withdrawn position by measuring in advance a relationship between the times and distances from the fully withdrawn position.

6. The magnetostrictive wire control rod position detector assembly according to claim 1, wherein:

said cylindrical member is the pressure housing of a control rod drive unit;

said movable member is a drive shaft connected to the control rod of said control rod drive unit; and the position within a reactor core of said control rod which is connected to said drive shaft is detected along the entire length of a drive stroke from a fully withdrawn position to a fully inserted position by detecting the position of said drive shaft.

7. The magnetostrictive wire control rod position detector assembly according to claim 6, wherein the construction comprises means for determining the time from the commencement of the descent of the control rod to any detected position of the control rod when the control rod is allowed to descend from the fully withdrawn position by measuring in advance a relationship between the times and distances from the fully withdrawn position.

8. The magnetostrictive wire control rod position detector assembly according to claim 1, wherein a cylindrical support member is disposed so as to seal closed the outer circumference of said cylindrical member and said magnetostrictive wire detector with a predetermined spacing.

9. The magnetostrictive wire control rod position detector assembly according to claim 1, wherein a protective member composed of the same non-magnetic material as said non-magnetic portion of said movable member is mounted so as to hermetically seal said magnet or magnets against said non-magnetic portion.

* * * * *